J. F. MAMET.
SHOCK ABSORBER FOR VEHICLES.
APPLICATION FILED MAR. 10, 1913.

1,066,933.

Patented July 8, 1913.

2 SHEETS—SHEET 1.

UNITED STATES PATENT OFFICE.

JULIEN FRANÇOIS MAMET, OF BILLANCOURT, FRANCE.

SHOCK-ABSORBER FOR VEHICLES.

1,066,933.  Specification of Letters Patent.  Patented July 8, 1913.

Application filed March 10, 1913. Serial No. 753,299.

*To all whom it may concern:*

Be it known that I, JULIEN FRANÇOIS MAMET, of 6 Rue Damiehs, Billancourt, Seine, Republic of France, aviator, have invented Improvements in and Relating to Shock-Absorbers for Vehicles, of which the following is a full, clear, and exact description.

The shock absorbers for the suspension of vehicles at present in use present various inconveniences the principal of which are as follows: the considerable weight and volume of these devices, their rapid wear and the fact that they are speedily rendered useless owing to the collapse of the springs.

The present invention has for its object a form of shock absorber enabling these defects to be obviated.

This shock absorber can be fitted to all vehicles without the necessity for modifying the latter, and it affords the necessary flexibility to the suspension for absorbing both large and small shocks. Furthermore, it permits of the operation of the ordinary springs of the vehicle in case its elastic portion should break.

The present shock absorber is formed by a double shackle constituted by two pairs of bent levers, pivoted at one of their extremities to the same pivot and united in pairs by other spindles upon which the leaf springs of the suspension are mounted. The other extremity of each pair of levers receives a cross piece intended to serve as point of attachment for one or more spiral springs the position of these cross members being adjustable according to the load carried by the vehicle.

Figure 4:
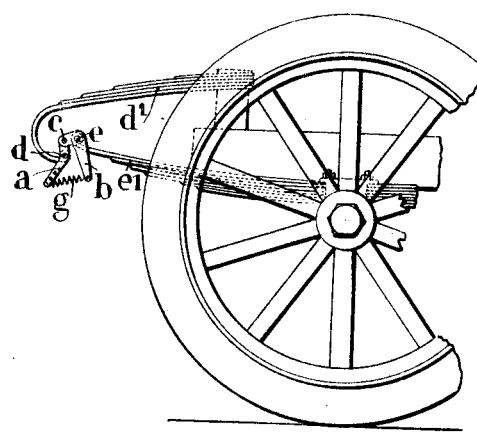
Figure 5:
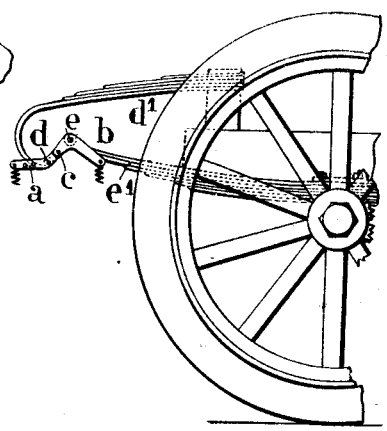
Figure 1:
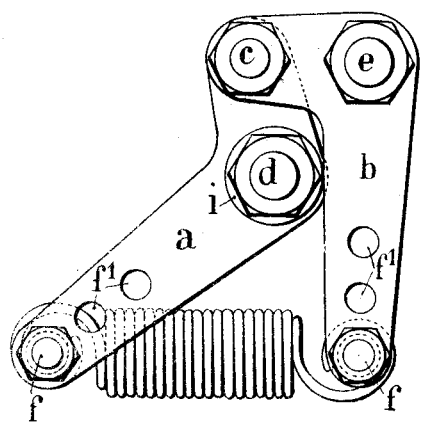
Figure 3:
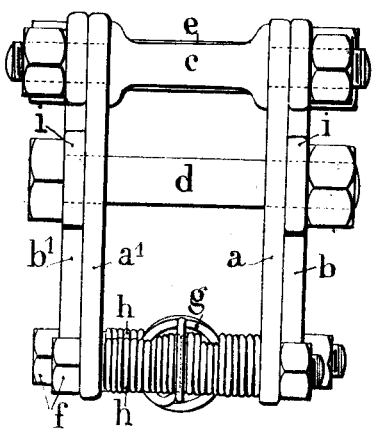
Figure 2:
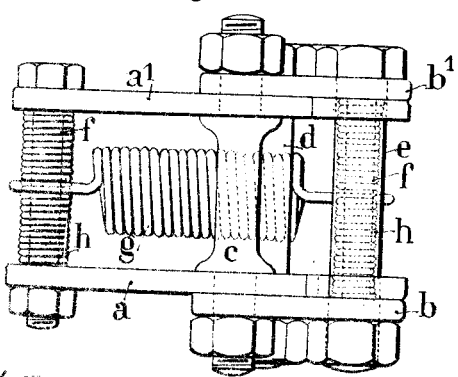
Figure 6:
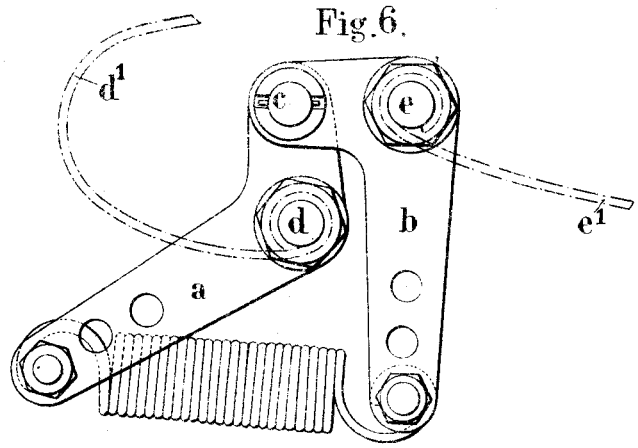
Figure 7:
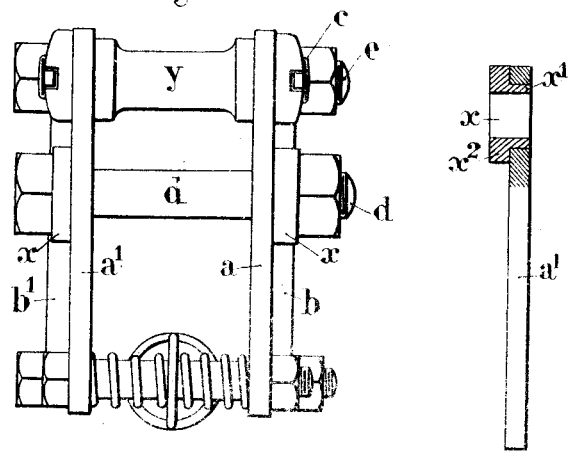
Figure 8:
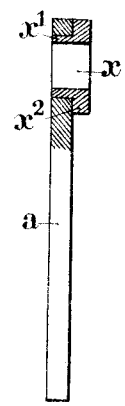
Figure 9:
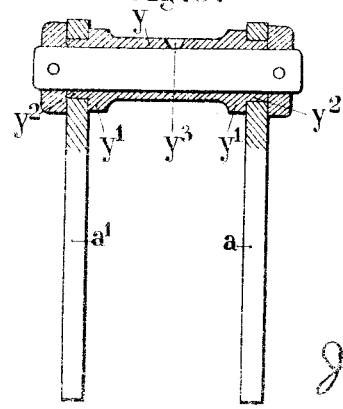

The invention is illustrated by way of example in the accompanying drawing, in which:

Figure 1 shows the present shock absorber in elevation. Fig. 2 is a corresponding plan. Fig. 3 is a side elevation thereof. Fig. 4 shows the shock absorber in use. Fig. 5 shows the position occupied by the shock absorber in case its springs should break. Fig. 6 shows in elevation this shock absorber provided with a reinforcing device. Fig. 7 is a side view thereof. Fig. 8 shows in section a device serving to reinforce or strengthen the openings receiving the bolts connecting the springs to the apparatus. Fig. 9 illustrates in longitudinal section a tie-tube receiving the common axis connecting the two pairs of bent levers.

As shown in the drawing, the shock absorber comprises two pairs of bent levers $a$ $a^1$ and $b$ $b^1$, the short arms of which are of the same length and are pivoted upon a pivot $c$ common to them both. The two levers $a$ and $a^1$ are connected one with the other on a level with their bent portion by a bolt $d$ serving as point of articulation for the extremity of the leaf springs $d^1$ fixed upon the chassis of the vehicle. The levers $b$ and $b^1$ are also united on a level with their bent portion by a bolt $e$ upon which the end of the leaf springs $e^1$ forming the lower portion of the suspension of the vehicle is mounted. The long arms of the levers $a$ $a^1$ and $b$ $b^1$ are connected respectively one with the other by a cross member $f$, and upon each of these members the end of one or more spiral springs $g$ is mounted. According to the load to be carried by the vehicle and in order to permit of varying as desired the leverage of the levers, the cross members $f$ may occupy different positions. With this object openings $f^1$ are formed in the long arms of the levers $a$ $a^1$ and $b$ $b^1$; these openings $f^1$ serve for the reception of the cross members $f$ constituted by bolts. With the object of maintaining the normal interval between the branches of the levers $a$ and $a^1$ and $b$ $b^1$ and of preventing the slackening of the nuts of the cross-members $f$, each of the latter is engaged in a spiral spring $h$ the convolutions of which are compressed between the branches of the levers. This device may be reinforced by a metal tube in which each of the cross members $f$ is engaged and which is placed inside the spring $h$. When the vehicle is at rest, the coming together of the two pairs of levers $a$ $a^1$ and $b$ $b^1$ is limited on each side by a washer $i$, mounted upon the bolt $d$ and striking against the long arms of the levers $b$ and $b^1$.

The operation of this apparatus will be readily understood. When the wheel receives a shock and the leaf springs $d^1$ and $e^1$ yield, the extremities of the latter tend to separate one from the other. These springs being mounted upon the bolts $d$ and $e$ respectively uniting the levers $a$ and $a^1$, and $b$ and $b^1$, also tend to separate the long arms of these levers. The spring or springs $g$ then again become operative and return the levers to their initial position in absorbing the effect of the shock which is therefore not transmitted to the vehicle.

The present type of shock absorber presents numerous advantages, of which the principal are as follows: 1. It can be fitted to vehicles of all kinds, like a simple shackle, without modification of the vehicle. 2. It is very strong and enables shocks of all kinds whether large or small to be absorbed. 3. It keeps the vehicle always plumb and eliminates friction and consequently wear that occurs in ordinary shock absorbers. 4. By reason of the position occupied by the shock absorber (position represented in Fig. 4) and more particularly by the bolts serving as pivots for the extremities of the leaf springs, the spring $g$ works only when a shock occurs, in such a manner that this spring, not being subjected to a constant strain, retains all its flexibility and does not become deformed. 5. The shock absorber is able to withstand different or progressive weights without the necessity for lengthening or flattening its spring to render it harder, which destroys its flexibility. 6. As stated above, the length of the lever arm of the apparatus can be regulated as desired by displacing the cross members $f$ upon which the spring $g$ is engaged, in accordance with the load to be supported by the vehicle, and this without altering the tension of this spring which acts equally well under a large load and under a small load. 7. Finally this type of shock absorber affords absolute security, because if the spring $g$ should break, it would act as a simple shackle, as will be seen by examining Fig. 5.

It should also be noted that the present shock absorber is extremely light as compared with apparatus of the same kind hitherto employed and that it cannot be affected like said devices, by the action of dust or mud. Furthermore, all its parts are readily accessible and it can be speedily cleaned.

It should be understood that the method of attaching the spring $g$ may vary as desired and that this spring presents a strength appropriate to the load to be carried normally by the vehicle. Moreover, in order to strengthen the holes through which pass the bolts $e$ $d$, these passages can be surrounded by rings $x$ serving as bearings for said bolts. These rings comprise a collar $x^1$ fitted and set on one side in the double lever, while a shoulder $x^2$ locks this ring on the other side, as illustrated in Figs. 6, 7 and 8. A tie-tube $y$ can also be provided, connecting the inner pair of levers and serving as bearings for the common axis $c$. This tie-tube is constituted by a cylindrical middle part $y$, two shoulders $y^1$ and two collars $y^2$ fitted in the inner pair of double levers and then set in the latter, while a flat part prevents them from rotating. A milled perforation $y^3$ allows to lubricate the common axis $c$ fitted in this tie-tube, as illustrated in Fig. 9.

Claims:

1. A jointed shock absorber for the suspension of vehicles of all kinds, characterized by two pairs of bent levers with unequal arms articulated upon a common spindle, the extremities of the long arms of the levers of each pair being united one with the other by cross members, the cross members uniting the long arms of each pair of levers being connected one with the other by one or more spiral springs, the bent portions of each pair of levers being united by bolts upon which the spring fixed to the vehicle body and the spring fixed to the axle are attached respectively.

2. A jointed shock absorber for the suspension of vehicles of all kinds, characterized by two pairs of bent levers with unequal arms articulated upon a common spindle, the long arms of each pair of levers presenting apertures into which cross members can be introduced for modifying when desired the length of the lever arms according to the load to be carried by the vehicle, the cross members uniting the long arms of each pair of levers being connected one with the other by one or more spiral springs, the bent portions of each pair of levers being united by bolts upon which the spring fixed to the vehicle body and the spring fixed to the axle are attached respectively.

3. A jointed shock absorber for the suspension of vehicles of all kinds, characterized by two pairs of bent levers with unequal arms articulated upon a common spindle, the extremities of the long arms of the levers of each pair being united one with the other by cross members, the cross members uniting the long arms of each pair of levers being connected one with the other by one or more spiral springs, the bent portions of each pair of levers being united by bolts upon which the spring fixed to the vehicle body and the spring fixed to the axle are attached respectively, and spiral springs passed upon the cross members, maintaining the normal interval between the long arms of the pairs of levers.

4. A jointed shock absorber for the suspension of vehicles of all kinds, characterized by two pairs of bent levers with unequal arms articulated upon a common spindle, the extremities of the long arms of the levers of each pair being united one with the other by cross members, the cross members uniting the long arms of each pair of levers being connected one with the other by one or more spiral springs, the bent portions of each pair of levers being united by bolts upon which the spring fixed to the vehicle body and the spring fixed to the axle are attached respectively, and a stay-tube fitted on the common spindle connecting the two pairs of bent levers.

The foregoing specification of my improvements in and relating to shock absorbers for vehicles signed by me this 25th day of February, 1913.

JULIEN FRANÇOIS MAMET.

Witnesses:
LUCIEN MEMMINGE,
RENÉ THIRIOT.